May 10, 1932.  L. A. PARADISE  1,858,025

GREASE GUN

Filed Dec. 28, 1928

Inventor
Louis A. Paradise.
By W.C. Jordinston
Attorney

Patented May 10, 1932

1,858,025

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

GREASE GUN

Application filed December 20, 1928. Serial No. 328,921.

My invention relates to devices for supplying grease where necessary for lubricating purposes, and is especially designed as an improvement on what is known as the Zerk grease gun, my invention having for its object to provide a means by the operation of which lubricating material can be supplied where needed without undue waste of time in adapting the gun to various openings as will be more fully described hereinafter.

Referring to the drawings in which similar numerals indicate identical parts—

A device commonly known as a grease gun, and of the type shown, is utilized to supply a lubricant, either through a nipple located on the mechanism where lubrication is necessary, or through an opening in the metal of a part of the mechanism. On the greater number of mechanical structures, having movable parts, nipples and also plain openings, for the admission of a lubricant, are usually found, and when a gun, of the type noted, is used to furnish proper lubrication it has been found that the nozzle of the gun, which is adapted to fit over a nipple to supply grease thereto, cannot be utilized when it is desired to force grease through a plain opening, consequently after the gun has been used to supply grease through a nipple a change must be made at the nozzle of the gun to accommodate it to a plain opening.

To make the change the gun must be placed in a vise and rigidly held therein while the nozzle is detached to be substituted by one of the form desired, an operation requiring loss of time particularly if the means to be employed in such an operation is an appreciable distance from the mechanism being lubricated. In order to avoid the necessity of making a change in the nozzle, after the latter has been used on a nipple and it is desired to supply grease to a plain opening, I have provided a device which can be permanently attached to the gun, and which can be readily applied over the nozzle to engage with a plain opening and through which grease can be supplied thereto.

Figure 1:
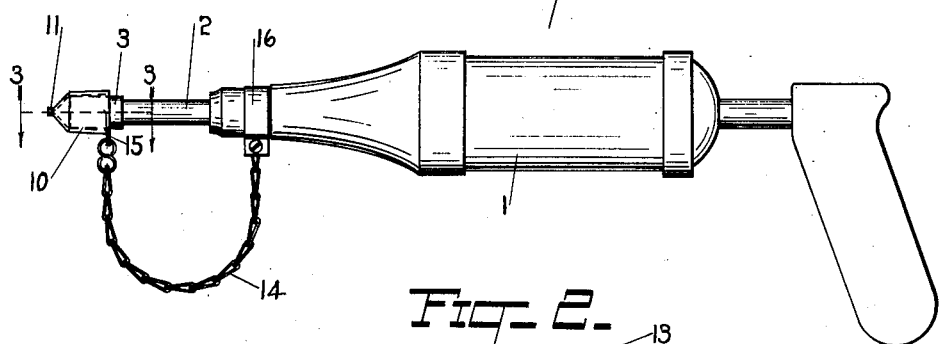
Figure 1 is a side elevation of a grease gun with my improvement thereon.
Figure 2:
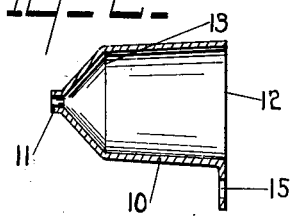
Figure 2 is an enlarged longitudinal section of my device.
Figure 4:
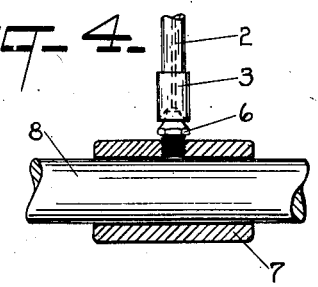
Figure 4 illustrates the ordinary operation of supplying grease from a grease gun through a nipple secured in a bearing.
Figure 3:
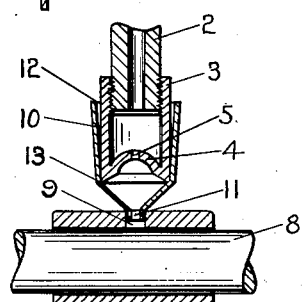
Figure 3 is an enlarged section on the line 3—3 of Figure 1 illustrating the application of my improvement for supplying grease to a bearing through a hole therein.

In the drawings Figure 1 shows the type of grease gun noted, well known, in the art and commercially, and adapted to hold a supply of grease in the body 1 from which it is expelled by compression, in the usual manner, through a tube 2 having its delivery end threaded to engage with the inner threaded end of a nozzle 3. The delivery end of the nozzle 3 is closed by a concavely spherical part 4 of the nozzle having an opening 5 through which grease is forced into a nipple 6, the latter shown inserted in a bearing 7 in which is journaled a shaft 8. The application of the nozzle 3 to the nipple 6 is readily apparent in Figure 4. It will be seen, from this description of the nozzle, that it is impossible to supply grease therefrom to a plain opening or hole such as 9 in Figure 3, and to provide a means of supplying grease to such an opening without removing the nozzle 3 and substituting therefor another part that would be adapted for insertion in the opening 9 I have devised a cap 10 or supplementary nozzle adapted for use over the nozzle 3 and terminating in a spout 11 which can readily be inserted in a hole, such as 9, in any part of a mechanism requiring lubrication.

The cap, or supplementary nozzle 10, has a greater diameter at 12 than the diameter of the nozzle 3 so that it can readily be placed over the nozzle 3, the diameter of the cap decreasing until at the point 13 it is adapted to grip the end of the nozzle 3 and be held by friction in contact therewith as long as desired. From the point 13 the cap is funnel shaped and terminates with a spout 11 which is adapted to fit in the opening 9 in the bearing 7. To secure the cap 10 against loss I provide a chain 14 one end of which is attached to a projection 15 and the opposite end secured to a collar 16 on the body 1. It is apparent that the gun is adapted, by the addition of my device, for use on any mechanism having nipples and plain openings to receive grease, and the necessity of removing the nozzle 3 and substituting another to fit an opening like 9, has been avoided.

What I claim is—

In a grease gun of the type described including a nozzle having a concave depression in the end thereof, and an opening in the center of the depression communicating with the inside of the gun, the combination therewith of a supplementary nozzle adapted to be placed over the other nozzle, the supplementary nozzle having a tip portion of conical shape and having an opening in the apex thereof communicating with the inside of said tip portion.

LOUIS A. PARADISE.